United States Patent Office 3,155,293
Patented Nov. 3, 1964

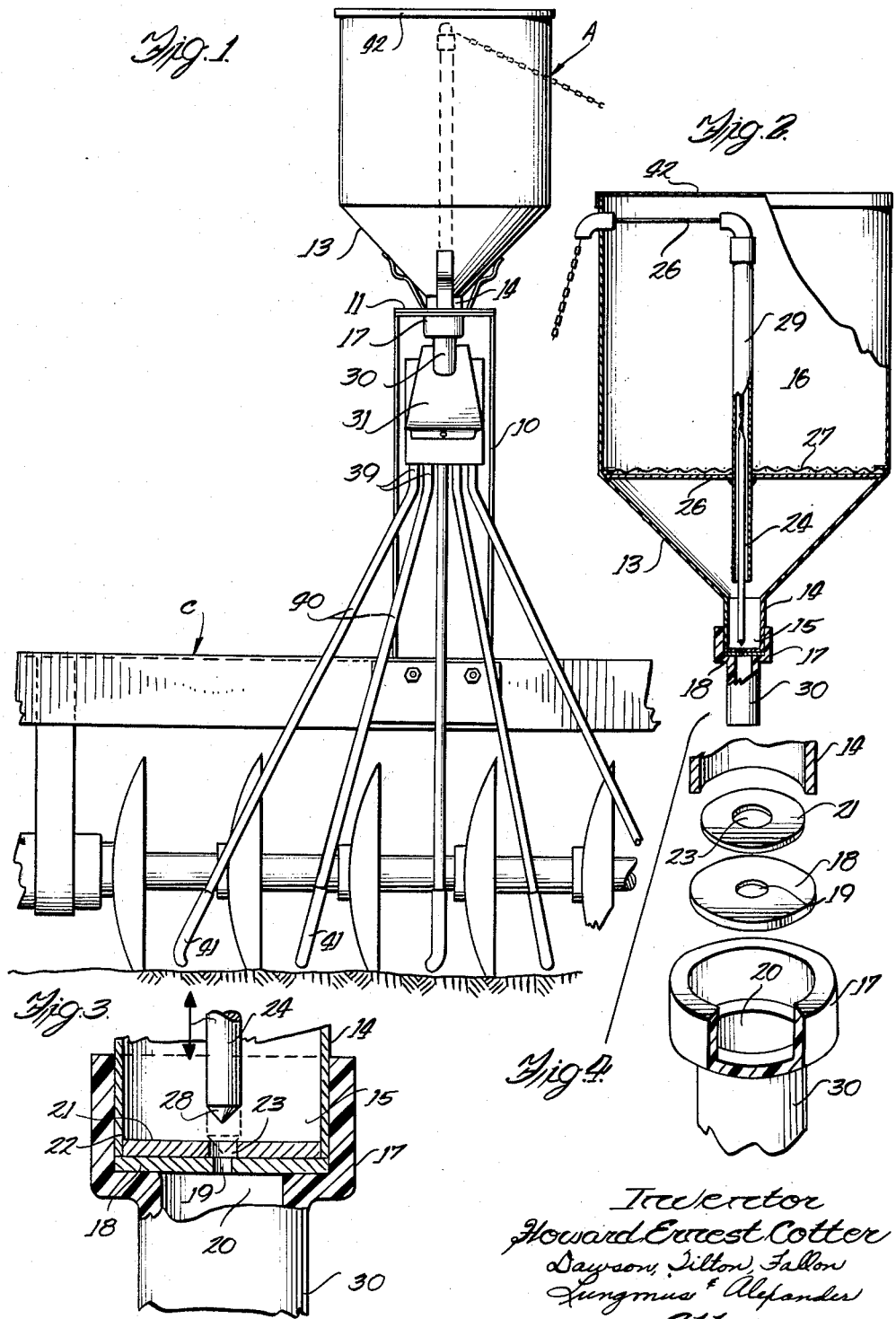

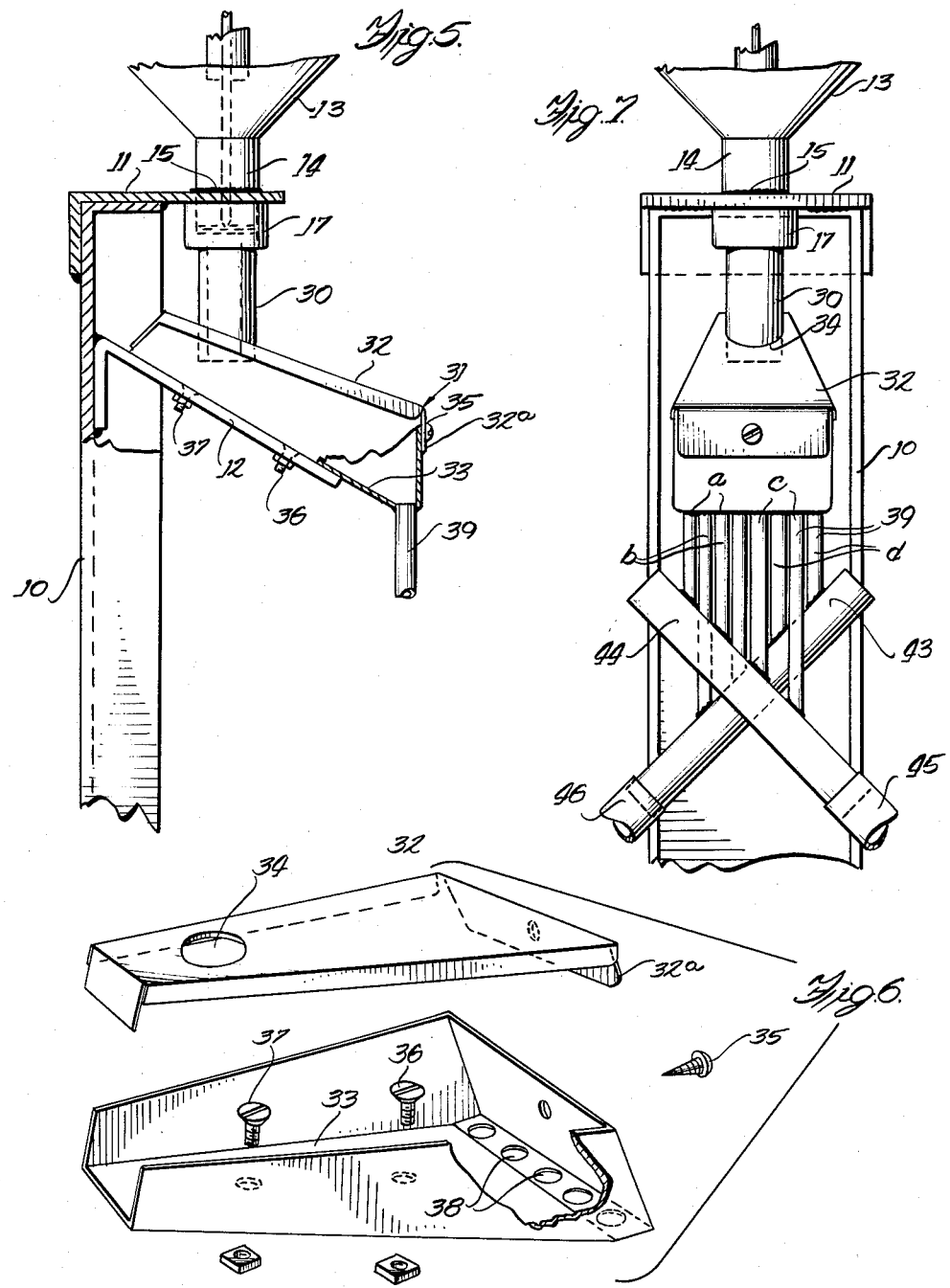

3,155,293
SPREADER APPARATUS
Howard Ernest Cotter, Flanagan, Ill.
Filed Aug. 3, 1962, Ser. No. 214,597
6 Claims. (Cl. 222—478)

This invention relates to a spreader apparatus of the gravity flow type which is particularly adapted for applying finely-divided dry materials, such as granular insecticides, to the soil in the raising of corn and other crops. For example, the apparatus has particular utility in applying granular insecticides such as aldrin or heptachlor to the soil for the control of corn pests such as grubs, wireworm, etc. at the same time as the corn is being planted, or when the seed bed is being cultivated or prepared by a disc cultivator. The spreader apparatus can also be used for other purposes, including broadcast distribution of a granular herbicide for weed control.

In my prior Patent No. 2,962,194 there is disclosed a spreader apparatus which includes a highly advantageous flow-control means. As described therein the rate of application of the DDT or other granular material is controlled by means of removable discs which are selectively supported at the bottom of a tubular hopper outlet by means of a resilient cup which is frictionally received on the lower end of the tubular outlet. The bottom of the cup supports the flow control disc, and provides an opening in alignment with the disc of greater size than the disc opening. Discs providing holes of varying size are used to change the flow rate. However, with the apparatus described in my prior patent, the advantages of this flow control means could not be fully realized. It is difficult to change rate control discs and retain material in the hopper. Also, there is a need for a simpler and more effective means for opening and closing the hopper outlet. Still another problem relates to the application of the granular material when it is desired to confine the material to a particular line along each of the rows being treated. There is also the problem of complete wind protection from the hopper to the ground.

It is therefore a general object of the present invention to provide an improved spreader apparatus which overcomes the problems and difficulties set out above. Further objects and advantages will be indicated in the following detailed specification.

The invention is shown in illustrative embodiments in the accompanying drawings, in which—

FIG. 1 is a rear elevational view of an apparatus embodying the present invention mounted on a disc cultivator;

FIG. 2 is an enlarged broken sectional view of part of the apparatus of FIG. 1, the apparatus components being rotated 90° from their showing in FIG. 1;

FIG. 3 is an enlarged detailed view, partly in section, of the hopper outlet and associated elements of the same apparatus;

FIG. 4 is an enlarged perspective view showing the elements of FIG. 3 in separated relation, one of the elements being shown in section and another partly broken away;

FIG. 5 is a side elevational view of part of the same apparatus;

FIG. 6 is a perspective view showing the parts of the distributor box in separated relation; and FIG. 7, a rear elevational view, similar to FIG. 1, showing a modified form of the spreader apparatus.

As shown in FIG. 1, the spreader apparatus, designated generally by the letter A, is mounted on a horizontally-extending frame member of a disc cultivator, designated generally by the letter C. In the illustration given, there is provided a vertically extending standard 10 which is equipped at its top with a rearwardly extending support arm 11 and at an intermediate position with an angular support brace 12, as shown more clearly in FIG. 5. A hopper 13 is mounted on arm 11. Preferably, hopper 13 includes a tapered or converging bottom portion 13, which connects to a lower tubular neck portion 14. In the illustration given, neck portion 14 extends through an opening in arm 11, and is secured to arm 11 by means of a welded joint as indicated at 15 in FIG. 5.

As shown more clearly in FIG. 2, neck portion 14 provides an outlet 15 from the interior 16 of the hopper. The construction of the outlet 15 and the associated components are shown more clearly in FIGS. 3 and 4.

As in the apparatus described in my prior Patent 2,962,194, a resilient cup 17 is frictionally-received on the lower end of the tubular neck portion 14. Member 17 can be formed of rubber or any other suitable resilient material. It will be understood that cup 17 should be dimensioned interiorly so that it is snugly received on the outside of neck 14. In accordance with my prior patent there is also provided a removable flow-control disc 18 which is received within cup 17 and supported by the bottom thereof. As shown more clearly in FIGS. 3 and 4, disc 18 provides an opening 19 therethrough which is of smaller size or cross-sectional area than the opening 20 in the bottom of cup 17. Opening 19 is of course aligned with opening 20.

In accordance with the present invention, there is provided a second disc 21 across the inside of the tubular neck 14 above flow control disc 18. Disc 21, however, is fixedly secured to neck 14, for example, by welding as indicated at 22 in FIG. 3. This construction permits cup 17 to be removed from neck 14, and disc 18 to be replaced with a similar flow-control disc having a different diameter opening in the center thereof, that is, either a larger or smaller opening than opening 19, while disc 21 remains attached to neck 14. The results accomplished by this will now be further described.

It will be noted that the fixed disc 21 has an opening 23 therethrough which is of larger diameter that the opening 19. In normal use, the opening 19 would never be larger than opening 23, and would usually be of smaller size, thereby permitting opening 19 to control the rate of flow. The purpose of the larger opening 23 is to provide a cutoff or closure for the hopper which is independent of the flow control means. This is preferably accomplished by providing means within hopper 12 for selectively opening and closing opening 23. This means will be arranged to bear against and to be supported by disc 21 when it is in closed position. With this construction, however, the closure means will not exert any downward force on disc 18 or cup 17. Furthermore, cup 17 can be removed to change the flow control disc 18 while hopper 12 contains the material being dispensed without the leakage of any of this material, the closure means being completely independent of the flow-control means.

As shown more clearly in FIG. 2 the preferred means for selectively opening and closing the outlet port 23 includes a rod 24 which is supported in vertical alignment within hopper 12, rod 24 extending upwardly from and being aligned with opening 23 (FIG. 3). There is also provided means for raising and lowering rod 24, and means for maintaining the alignment of the rod as it is raised and lowered. In the illustration given, the upper end of rod 24 is attached to a cable 25 which extends outwardly through the side of the hopper 12 to provide for remote control of the rod. If desired, means can be provided for pulling on cable 25 to raise rod 24, and thereby begin the dispensing operation, when the elements of the cultivator C are lowered into the ground.

In the illustration given, the guiding means consists of a tube 25 within which rod 24 reciprocates, as shown in FIG. 2. Tube 25 is rigidly attached to bar 26 which extends across the lower portion of the hopper. Bar 26 also supports a screen 27 which extends across the hopper for the purpose of retaining oversize granules within the hopper rather than permitting them to pass downwardly and plug-up the dispensing or distributing elements.

The lower end of rod 24 engages disc 21 and closes opening 23 when the rod is in its lowered position. Preferably, the lower tip end of rod 24 is sharpened or tapered as indicated at 28 in FIG. 3. The tapered end 28 partially enters opening 23 and seats on the edge of disc 21 surrounding the opening. This relationship is indicated by the dotted lines in FIG. 3.

In accordance with the present invention, cup 17 provides a downwardly extending tubular portion 30 which communicates with the interior of a distributor box 31. As shown in FIG. 1 and more clearly in FIG. 5, box 31 is mounted below cup 17. The distributor box is provided with a removable cover 32 and a downwardly and rearwardly inclined bottom wall 33. In the illustration given, the front and side walls of the box are made intergral with the bottom wall, while the rear wall is made integral with the cover, as shown more clearly in FIG. 6. In the illustration given and preferably, bottom wall 33 increases in width from the upper to the lower end thereof. The upper end of the cover 32 is provided with an opening 34 for slidably receiving cup extension 30. With this arrangement, extension 30 can be slipped into or removed from cover 32, as desired. For example, extension 30 can be lowered further into cover 32 to permit removal and replacement of flow control disc 18 without the necessity of removing cover 32. Alternatively, cover 32 can be raised to expose the interior of box 31 by sliding the cover upwardly on extension 30 without removing cup 17 from neck 14. The great convenience of this arrangement will readily be appreciated.

In the illustration given, the lower end of cover 32 provides a lip 32a which is secured to the forward wall of the box by means of a screw 35. The bottom 33 is detachably mounted on angle bracket 12 by bolts 36 and 37.

Preferably, the opening 34 in cover 32 is located above the upper forward portion of bottom 33 where the bottom has a substantially smaller width than at its lower rearward portion. As shown more clearly in FIG. 5, box 31 adjacent the lower end of bottom wall 33 is provided with a plurality of outlet openings 38 which extend across the bottom wall. In the illustration given in FIGS. 1 to 6, there are five of the openings 38. As shown in FIG. 1, a distributor tube 39 is connected to each of the openings 38 (FIG. 5), and extends downwardly therefrom. Where the spreader apparatus is mounted on a cultivator, as shown in FIG. 1, the distributor tubes 39 can be provided with extensions 40 which run downwardly to the level of the cultivator disc. With this construction, it is preferred to attach flexible sleeves 41 to the lower ends of the extensions. This permits the granular material to be released at the level of the ground being cultivated without danger of breaking the distributor tubes. The flexible sleeves 41 can yield on contact with rocks or large pieces of soil. Sleeves 41 can be formed of rubber and applied to extensions 40 by slip-on friction-type attachment.

In the operation of the spreader apparatus, the material to be applied, such as granular insecticide or herbicide, is charged to hopper 12. This can be done by removing the hopper cover 42. As part of the cultivating operation for corn or other crop, rod 24 is raised, and the granular material is dispensed through opening 23, the rate being controlled by the selected size of opening 19. The granular material flows downwardly through cup extension 30 into the upper part of distributor 32.

It falls on bottom wall 33 of the box and flows downwardly toward the lower end thereof, spreading out and distributing as it flows downwardly. Under normal field conditions, that is, on reasonably level terrain, a substantially equal amount of the granular material will enter each of the openings 38 and pass downwardly through the distributor tubes 39 to be applied along the line of each row, as determined by the position of extensions 40 and sleeves 41.

In FIG. 7, there is shown a modified construction which is particularly adapted for use on hilly, or non-level terrain, or any conditions where there is difficulty in obtaining the desired uniform distribution. In this modification, the corresponding parts have been given the same numbers. In this embodiment, the distributor tubes 39 are arranged in alternating pairs, such as the pair a, b, c, and d. There is also provided a plurality of separate applicator tubes, such as the tubes 43 and 44 in FIG. 7. Alternate pairs of the distributor tubes 39 connect with individual ones of the applicator tubes. For example, in the illustration given, the pairs a and c of the distributor tubes connect with applicator tube 44, while the pairs b and d connect with the applicator tube 43. With this arrangement, even if the distributor box 31 is in an inclined position, the quantity of granular material reaching each of the applicator tubes 43 and 44 will be approximately equal. As with the embodiment first described, there may also be provided flexible sleeves 45 and 46 which extend downwardly from the ends of the applicator tubes.

While in the foregoing specification this invention has been described in relation to specific preferred embodiments thereof, and many details have been set forth for purpose of illustration, it will be apparent to those skilled in the art that the invention is susceptible to other embodiments and that certain of the details described herein can be varied considerably without departing from the basic principles of the invention.

I claim:

1. In a spreader apparatus including a hopper having a lower tubular neck portion providing an outlet, a resilient cup frictionally-received on the lower end of said neck portion, the bottom of said cup having an opening therethrough in alignment with said outlet opening, and a removable flow-control disc received within said cup and supported by the bottom thereof, said disc providing an opening therethrough of smaller size than said cup opening and aligned therewith, the improvement comprising: a second disc extending across the inside of said tubular neck portion above said flow-control disc, said second disc being fixedly secured to said neck portion and providing an opening therethrough of larger size than the opening in said flow-control disc, and means within said hopper for selectively opening and closing the said opening in said second disc, said means including a closure element bearing against and being supported by said second disc when in said closed position, said closure element having a tapered lower end portion at least partially entering the said opening in said second disc but terminating above said first disc.

2. The apparatus improvement of claim 1 wherein said resilient cup provides a downwardly extending tubular portion, and wherein said apparatus also includes a gravity flow distributor box mounted below said cup, said box having a cover and a downwardly and rearwardly inclined bottom wall, said tubular cup portion extending through the cover of said box at a position above an upper portion of said bottom wall in open communication with the interior of said box, said box adjacent the lower end of said bottom wall providing a plurality of outlet openings extending thereacross, and distributor tubes connected to said box and extending downwardly from the said outlet openings in open communication therewith.

3. In a spreader apparatus including a hopper providing an outlet opening in the bottom thereof and a tubular member extending downwardly from said hopper opening, a gravity flow distributor mounted below said hopper, said gravity flow distributor comprising a box having a cover and a downwardly and rearwardly inclined bottom wall, said tubular member extending through the cover of said box at a position above an upper portion of said bottom wall in open communication with the interior of said box, said box adjacent the lower end of said bottom wall having a plurality of outlet openings extending thereacross, and distributor tubes connected to said box and extending downwardly from the said outlet openings in open communication therewith.

4. The spreader apparatus of claim 3 wherein there are at least four of said box outlet openings, and wherein there is also provided a plurality of separate applicator tubes of lesser number than said distributor tubes and extending downwardly below said distributor tubes, alternate pairs of said distributor tubes connecting with individual ones of said applicator tubes.

5. In a spreader apparatus including a hopper having a lower tubular neck portion providing an outlet opening, and a resilient cup frictionally-received on the lower end of said neck portion, the improvement comprising: a gravity flow distributor mounted below said hopper, said distributor comprising a box having a cover and a downwardly and rearwardly inclined bottom wall, said resilient cup providing a tubuar extension slidably received in an opening in said box cover in open communication with the interior of said box, said tubular cup portion extending through the cover of said box at a position above an upper portion of said bottom wall, said box adjacent the lower end of said bottom wall having a plurality of outlet openings extending thereacross, and distributor tubes connected to said box and extending downwardly from the said outlet openings in open communication therewith.

6. The spreader apparatus and distributor of claim 5 wherein there are at least four of said box outlet openings, and wherein there is also provided a plurality of separate applicator tubes of lesser number than said distributor tubes and extending downwardly below said distributor tubes, alternate pairs of said distributor tubes connecting with individual ones of said applicator tubes.

References Cited in the file of this patent

UNITED STATES PATENTS

| | | |
|---|---|---|
| 154,842 | Codville | Sept. 8, 1874 |
| 488,846 | Snell et al. | Dec. 27, 1892 |
| 1,066,660 | Ross | July 8, 1913 |
| 1,157,532 | Harper | Oct. 19, 1915 |
| 1,220,249 | McWhorter | Mar. 27, 1917 |
| 1,634,213 | Rookwood | June 28, 1927 |
| 2,959,328 | Palmer | Nov. 8, 1960 |
| 2,962,194 | Cotter | Nov. 29, 1960 |